United States Patent [19]

Naterstad et al.

[11] Patent Number: 4,659,442
[45] Date of Patent: Apr. 21, 1987

[54] METHOD OF REDUCING THE LOSS OF CARBON FROM ANODES WHEN PRODUCING ALUMINUM BY ELECTROLYTIC SMELTING, AND AN INERT ANODE TOP FOR PERFORMING THE METHOD

[75] Inventors: Tormod Naterstad; Knut Bergli, both of Årdalstangen; Jan Hurlen, Oslo, all of Norway

[73] Assignee: Årdal og Sunndal Verk AS, Oslo, Norway

[21] Appl. No.: 694,115

[22] Filed: Jan. 23, 1985

[51] Int. Cl.⁴ .......................... C22D 3/12; B01K 3/04
[52] U.S. Cl. .................. 204/67; 204/290 R; 204/294; 373/89; 373/91; 373/92
[58] Field of Search ...... 204/67, 294, 290 R; 373/89, 91, 92

[56] References Cited

U.S. PATENT DOCUMENTS

| | | | |
|---|---|---|---|
| 2,650,943 | 9/1953 | Lenchs | 204/294 |
| 3,398,081 | 8/1968 | Bonfils | 204/294 |
| 3,442,787 | 5/1969 | Landrum | 204/294 |
| 3,787,300 | 1/1974 | Johnson | 204/294 |
| 4,288,353 | 9/1981 | Eckel | 373/91 |

OTHER PUBLICATIONS

G. V. Samsonov and A. P. Epik, Coatings of High-Temperature Materials, 1966, Plenum Press, New York.
K. Billehaug and H. A. Oye, Aluminium 56 (1980), pp. 642-648 and 713-718.
K. Billehaug and H. A. Oye, Aluminium 57 (1981), pp. 146/150 and 228/231.
H. Schultz, W. D. Eckel, D. E. Etxel, P. R. Aeschbech and H. Friendly, Light Metals, 1982, pp. 661-669.

Primary Examiner—John F. Niebling
Attorney, Agent, or Firm—Wenderoth, Lind & Ponack

[57] ABSTRACT

Carbon losses are reduced in that an operative carbon anode is glued beneath a carbon core in an inert anode top. The operative anode carbon is almost completely consumed. The anode top is then cleaned and a new operative carbon is glued to its underside.

16 Claims, 3 Drawing Figures

METHOD OF REDUCING THE LOSS OF CARBON FROM ANODES WHEN PRODUCING ALUMINUM BY ELECTROLYTIC SMELTING, AND AN INERT ANODE TOP FOR PERFORMING THE METHOD

BACKGROUND OF THE INVENTION

This invention relates to a method of reducing the loss of carbon from anodes when producing aluminum by electrolytic smelting, and an inert anode for performing such method.

In producing aluminum by electrolytic smelting/reduction, carbon bodies, so called anode carbons, are used as anodes. During the reduction process, gases are liberated which oxidize the anode which is thus consumed and which must therefore be renewed.

Since the early beginnings of the aluminum industry, anodes have been in the form of carbon blocks fixed to a steel rod, so called anode rods. The mechanical and electrical connection is achieved by placing the anode rods, or extensions of these, studs, into holes in the upper side of the carbon block, fixing them there, either by casting them into position with molten iron, or tamping them with a carbon-based tamping paste.

In all cases, the carbon body has to be replaced when it has been consumed to such extent that there is a danger of the anode rod, or stud, being attacked by the electrolytic bath. When replaced, the unused part of the anode carbon will be 10–20 percent by weight of the anode when new.

It is immediately obvious that it is of great economic importance to reduce this carbon loss. Reducing the carbon loss will mean better utilization of the production plant for carbon bodies, and there will be less carbon waste to deal with.

Several methods are known for reducing anodic carbon loss.

Soderberg anodes are based on a special method whereby a continuous electrode is produced, i.e. with no carbon loss, in that the anode is produced by a continuous process in the electrolytic cell itself. For various reasons, the Soderberg anode is now being abandoned for the production of aluminum by electrolytic reduction.

In Germany, VAW developed a pre-baked anode which was to be capable of use without any waste. The anode was divided up into a number of carbons, the length of each carbon being the same as the breadth of the anode. Each anode carbon was fixed to an anode bus running along each long side of the anode, by means of copper bars screwed into the bus, two for each end of each anode carbon.

Renewing the anode was achieved by placing a new anode carbon on top of the old. The new carbon had a gluing sole whereby the remains (the butt) of the old anode carbon would remain suspended and be consumed when the new anode anode carbon was put into service by disconnecting the copper bars from the old carbon and attaching them to the new.

In earlier German Pat., BRD Nos. 863,999 and 1,090,867, the adhesive paste which was used in the arrangement in question was described. A non-homogeneous layer of the thickness in question (at least 5 mm) gives rise to considerable problems with respect to the passage of the electric current, in addition to the selective oxidization of the binder phase when the joint is consumed in the wearing surface over a period of about 48 hours.

This type of pot has proved difficult in practice, particularly when producers change over to electrolytic cells operating at higher currents. This type of pot has therefore been abandoned.

In principle, the type of anode used today is the same as it was in the early days of the aluminum industry, but the individual anode carbons are larger and usually held by two or three contact studs in each anode carbon.

SUMMARY OF THE INVENTION

The present invention discloses that it is possible to reduce carbon loss by gluing the anode carbon beneath an inert anode top which, after use, is cleaned of anode remnants, and to which a new anode carbon is then glued.

The inert anode top consists of a carbon core covered with one or more protective layers, which core is connected by contact studs to a yoke on an anode rod.

The protective layer on the carbon core consists, on the inside, of a layer of carbon-bound SiC or $Al_2O_3$ and this layer is in turn protected by a layer of calcium aluminate-bound SiC or $Al_2O_3$.

The protective layer can also be covered with a layer of melted slag/dross, skimmed from molten aluminum during casting.

Norwegian Pat. No. 132,596 discloses a method of applying alumina ($Al_2O_3$), or alumina and aluminum, in a fine-grained form by means of an ionized gas jet. This method is energy-intensive, and the protective layer which can be applied in practice has proved too thin and porous to provide efficient protection of the oxidizable anode carbon. The extra heat insulation resulting from this thermal coating causes the surface temperature of the anode carbon to rise, thus increasing surface oxidization, unless the protective layer is gastight.

A number of techniques for achieving the binding of carbides, borides and oxygen compounds and oxides, such as refractory materials and protective layers, are known.

The problems attached to the use of various types of thermal materials in contact with cryolite-containing melts and vapours have also been thoroughly discussed in the literature.

Hitherto, known arrangements have been limited by resistance to thermal shock, changes in thermal expansion through the absorption of melt components, or lack of intertness vis-á-vis melt or melt vapours with resultant unacceptable contamination of the electrolyte and the metal produced. Apart from the purely technical limitations, possible savings, compared with existing arrangements with uncovered or alumina-covered anodes, will be conditional upon very simple, inexpensive solutions. In the arrangement proposed, the necessary new surface coating to prevent corrosion by the melt can be limited to a small belt in the lower part of the anode top when attaching a new operative anode carbon.

The gluing of anode rods to anode carbons is known, inter alia from E. Schultz et al.

The arrangement cited does however require the use of a conducting metallic additive in the adhesive in question to reduce electrical resistance in the layer between the current-supply area and the anode carbon which, when recycling the anode butts, requires additional measures to remove contaminants.

In the present invention, the connection between the carbon core and the contact studs will be achieved in that the carbon core has grooves into which the contact studs are made to fit. The studs slide into the grooves are locked in position therein.

It has further been found advantageous that a special glue be used for gluing the prebaked anode carbon to the carbon core in the inert anode top. This glue contains a binding agent which is liquid at room temperature, and which consists of a mixture of two components, A and B, and a catalyst, in which component A is hardened by the catalyst within the temperature range 10°-250° C., and which consists of partly polymerized furfuryl resin based on self-condensed furfuryl alcohol with a maximum of 50% by weight of monomer, and a maximum viscosity of 500 mPas, while component B is a tar which becomes solid at at least 200° C. above the curing (hardening) temperature of component A, which tar has a softening point below 60° C. R & B (i.e., Ring and Ball), in that 92-99% by weight of the bonding agent consists of A+B, in which component B accounts for between 40 and 90% by weight of the component mix, and the catalyst 8-1% by weight of the total mix.

BRIEF DESCRIPTION OF THE DRAWINGS

The invention now will be described in more detail with reference to the attached drawings, wherein.

DETAILED DESCRIPTION OF THE INVENTION

Figure 1:
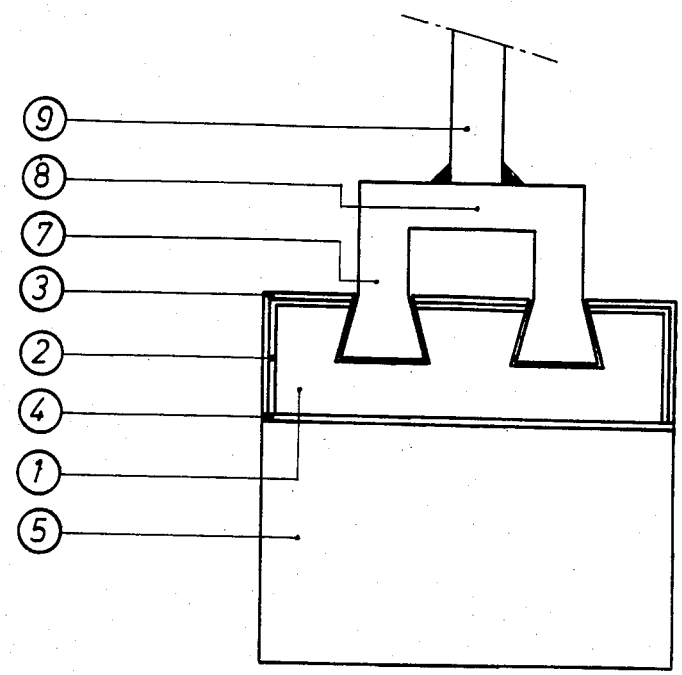
FIG. 1 is a schematic view of an assembly of an inert anode top and a working anode.

A carbon core 1, usually of graphite, is provided with an inner layer 2 of carbon-bound SiC which, in turn, is protected by layer 3, consisting of calcium aluminiate-bound SiC. By means of a layer of adhesive 4, an operative anode 5 is glued firmly to the underside of the carbon core 1.

In the carbon core are grooves 6 into which extend contact studs 7 which in turn, through a yoke 8, are electrically and mechanically connected with an anode rod 9.

Figure 2:
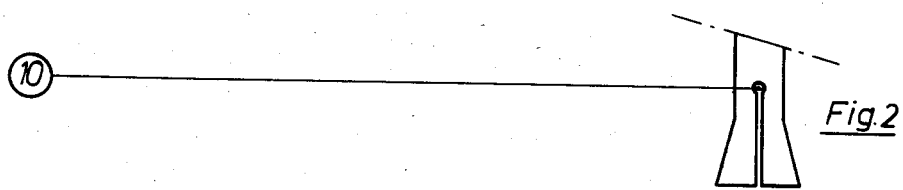
FIG. 2 is a partial view of an alternative design of a contact stud.
Figure 3:
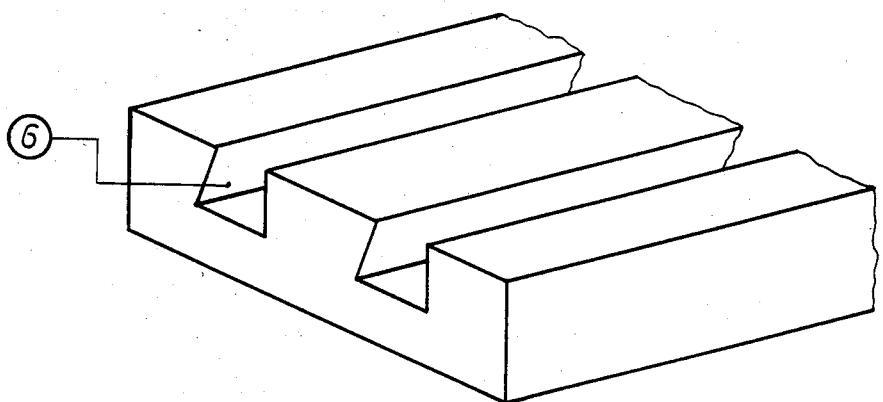
FIG. 3 is a perspective view of the inert anode top.

A feature of the invention is that the grooves 6 are so shaped that the contact studs 7 with rod 9 can slide sideways into the grooves and then be locked in position therein. Grooves 6 with contact studs 7 and also the method of fixture can be of various designs, and the invention is not limited to the embodiment or configuration shown in FIG. 2, in which a wedge 10 locks the contact stud 7 in position in the groove 6.

The procedure for making the carbon core according to the invention will, in all essentials, be the same as that for making conventional pre-baked anodes. The core can be a graphite block which is machined, or it may be made of a special carbon body produced by vibration moulding or tamping. The carbon body is then baked/calcined, with appropriately shaped strips of wood inserted to produce the desired grooves. It is then coated with a protective layer or layers which is (are) air cooled and hardened before final baking.

The required grooves may also, wholly or partly, be produced by mechanical machining, such as milling, after the carbon core has been baked, but it may then be necessary to give the protective layer(s) an extra heat treatment.

Depending upon the production procedure, the operative anode 5 is glued to the underside of the carbon core 1 before or after fitting the contact studs 7 with anode rod 9.

When the operative anode 5 has been almost consumed, the remaining butt is removed complete with the yoke and rod, and the remains of the operative anode plus the layer of adhesive is cut or milled from the inert carbon core 1 before a new operative anode 5 is glued thereto.

This invention results in a significant reduction in anode butts.

We claim:

1. A prebaked anode assembly for use in the production of aluminum by electrolytic smelting with reduced carbon loss, said assembly comprising:

an anode rod fixed to a yoke having contact studs;

an inert anode top consisting of a carbon core covered with at least one protective layer, said contact studs being connected to an upper portion of said carbon core, and said carbon core having a lower surface free of said protective layer; and an operative carbon anode glued to said lower surface of said carbon core by a layer of adhesive such that said operative carbon anode extends downwardly from said lower surface, whereby after substantial consumption of said operative carbon anode during use, the resultant remaining anode butt may be removed and a new operative carbon anode may be glued to said lower surface.

2. An assembly as claimed in claim 1, wherein said lower surface is entirely planar.

3. An assembly as claimed in claim 1, wherein said carbon core is covered by a layer of carbon-bound SiC or $Al_2O_3$, and that this layer, in turn, is covered by a layer of calcium aluminate-bound SiC or $Al_2O_3$.

4. An assembly as claimed in claim 1, wherein said carbon core is coated with a layer of calcium aluminate-bound $Al_2O_3$.

5. An assembly as claimed in claim 1, wherein said carbon core is coated with a layer of melted slag/dross skimmed from molten aluminum.

6. An assembly as claimed in claim 1, wherein said upper portion of said carbon core has formed therein parallel longitudinal grooves having cross sections which widen downwardly, and said contact studs have configurations complementary to said cross sections of said grooves, such that said contact studs slide longitudinally relative to said carbon core into said grooves.

7. An assembly as claimed in claim 6, further comprising means for locking said contact studs in position in said grooves.

8. An assembly as claimed in claim 1, wherein said adhesive comprises a rapidly hardening glue with a bonding agent, liquid at room temperature, consisting of a mixture of two components A and B, and a catalyst, in which component A is hardened by the catalyst within the temperature range 10°-250° C., and which consists of partly polymerized furfuryl resin based on self-condensed furfuryl alcohol with a maximum of 50% by weight of monomer, and a maximum viscosity of 500 mPas, while component B is a tar which becomes solid at at least 200° C. above the curing (hardening) temperature of component A, which tar has a softening point below 60° C., in that 92-99% by weight of the bonding agent consists of A+B, in which component B accounts for between 40 and 90% by weight of the component mixture, and the catalyst 8–1% by weight of the total mixture.

9. A method of forming and using prebaked anode assembly during the production of aluminum by electrolytic smelting with reduced carbon loss, said method comprising:

providing an inert anode top consisting of a carbon core covered with at least one protective layer, with said carbon core having a lower surface free of said protective layer;

connecting an upper portion of said carbon core to contact studs of a yoke fixed to an anode rod;

gluing to said lower surface of said carbon core by means of a layer of adhesive an operative carbon anode such that said operative carbon anode extends downwardly from said lower surface;

conducting an electrolytic smelting operation during which said operative carbon anode substantially is consumed, leaving an anode butt; and removing said anode butt, gluing a new operative carbon anode to said lower surface, and conducting further electrolytic smelting.

10. A method as claimed in claim 9, comprising providing said lower surface as an entirely planar surface.

11. A method as claimed in claim 9, comprising covering said carbon core with a layer of carbon-bound SiC or $Al_2O_3$, and covering this layer, in turn, with a layer of calcium aluminate-bound SiC or $Al_2O_3$.

12. A method as claimed in claim 9, comprising coating said carbon core with a layer of calcium aluminate-bound $Al_2O_3$.

13. A method as claimed in claim 9, comprising coating said carbon core with a layer of melted slag/dross skimmed from molten aluminum.

14. A method as claimed in claim 9, wherein said connecting comprises providing said upper portion of said carbon core with parallel longitudinal grooves having cross sections which widen downwardly, providing said contact studs with configurations complementary to said cross sections of said grooves, and sliding said contact studs longitudinally relative to said carbon core into said grooves.

15. A method as claimed in claim 14, further comprising locking said contact studs in position in said grooves.

16. A method as claimed in claim 9, wherein said adhesive comprises a rapidly hardening glue with a bonding agent, liquid at room temperature, consisting of a mixture of two components A and B, and a catalyst, in which component A is hardened by the catalyst within the temperature range 10°–250° C., and which consists of partly polymerized furfuryl resin based on self-condensed furfuryl alcohol with a maximum of 50% by weight of monomer, and a maximum viscosity of 500 mPas, while component B is a tar which becomes solid at at least 200° C. above the curing (hardening) temperature of component A, which tar has a softening point below 60° C., in that 92–99% by weight of the bonding agent consists of A+B, in which component B accounts for between 40 and 90% by weight of the component mixture, and the catalyst 8–1% by weight of the total mixture.

* * * * *